United States Patent Office 3,305,559
Patented Feb. 21, 1967

3,305,559
PHTHALOCYANINE DYESTUFFS
Rudolf Kühne and Fritz Meininger, Frankfurt am Main, and Heinrich Frölich, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed June 9, 1964, Ser. No. 373,859
Claims priority, application Germany, June 10, 1963, F 39,951
6 Claims. (Cl. 260—314.5)

The present invention relates to new phthalocyanine dyestuffs and to a process for preparing them; more particularly it relates to dyestuffs of the general Formula 1

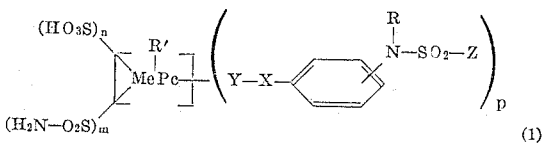

in which Me represents a metal atom, in particular a copper or nickel atom, Pc represents phthalocyanine, Y represents one of the groupings —NH—, —SO$_2$—NH-loweralkylene-NH—,

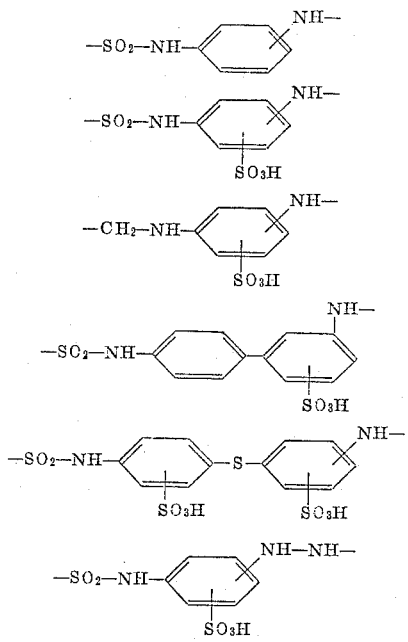

and

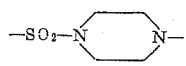

X represents one of the groupings —CO—, —SO$_2$— and —CO—NH—,
R represents a hydrogen atom or a lower alkylene group,
Z represents a —CH=CH$_2$— or —CH$_2$—CH$_2$-halogen-group,
R' represents a hydrogen atom or a halogen atom,
$n$ represents a whole number from 1 to 3,
$m$ represents a number from 0 to 2, and
$p$ represents 1 or 2.

We have found that new valuable phthalocyanine dyestuffs of the Formula 1 can be obtained, by reacting at temperatures in the range of about 0° to about 40° C., 1 mol of the dyestuff of the general Formula 2

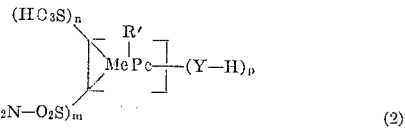

in which Pc, Me, R', Y, $n$, $m$ and $p$ are defined as above, with about 1 to 2 mols of a compound of the general Formula 3

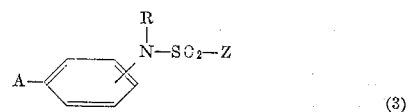

in which A represents one of the groupings —CO-halogen, —SO$_2$-halogen, and —N=C=O, and R and Z are defined as above.

The acylable amino groups of the starting dyestuffs of the general Formula 2 may be linked with an aromatic nucleus of the dyestuff molecule either directly or via an alkylene group, for example, a methylene, ethylene, propylene, isopropylene or butylene group; the alkylene group itself may be linked over a bridging member with the respective aromatic nucleus of the dyestuff molecule.

The reaction of the water-soluble starting dyestuffs of the general Formula 2 with the acid halides or isocyanates of the general Formula 3 is preferably carried out in water. The acid chlorides or isocyanates may be used either in concentrated form, if desired or required for a better distribution in the aqueous phase with preceding, simultaneous or subsequent addition of a substance having emulsifying action or a surfactant or dissolved in an organic solvent. Solvents which are suitable for this purpose are, for example, acetone, chloroform, benzene, toluene or chlorobenzene.

The reaction of the starting dyestuffs with the isocyanate compounds is carried out in the neutral or weakly alkaline pH range, if desired or required in the presence of buffer salt mixtures.

When the condensation reaction is complete, the water-soluble dyestuffs are precipitated, if desired after previous neutralization, from the solutions or suspensions, filtered, washed and dried.

The dyestuffs obtainable by the process of the present invention may also be prepared by reacting the starting dystuffs, particularly those which are sparingly water-soluble, with the acid halides or isocyanates of the Formula 3 in an inert organic solvent. If desired or necessary, these reactions are carried out in the presence of or while adding acid-binding agents. Solvents which are suitable for this purpose are, for example, benzene, toluene, chlorobenzene, nitrobenzene, tetrahydrofurane, acetone, dimethylformamide or dimethylacetamide.

The acid halides or isocyanate compounds of the Formula 3, used in accordance with the present invention for preparing the drystuffs, constitute novel compounds.

The acid halides of the Formula 4 or 5 can be prepared, for example,
(a) By reacting aminobenzenecarboxylic acids or -sulfonic acids with acylating agents which introduce the radical of the vinylsulfonic acid, for example, with carbyl sulfate or vinylsulfonic acid chloride, or
(b) By allowing, for example, acetic acid anhydride, methanesulfonic acid chloride or p-toluenesulfonic acid chloride to act on isethionylaminobenzene-carboxylic acids or -sulfonic acids, whereby the hydroxyl group in β-position is esterified.

The benzenecarboxylic acid- or benzenesulfonic acid derivatives obtained by the methods described under (a) and (b) may be alkylated, if desired, at the nitrogen atom bound to an aromatic nucleus, with an alkylating agent such as dimethyl sulfate or diethyl sulfate and then converted in known manner into the corresponding carboxylic acid or sulfonic acid halides.

The sulfonic acid chlorides of the Formula 3 may also be prepared from aniline derivatives of the general Formula 4

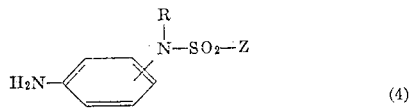
(4)

in which R and Z are defined as above, by diazotizing these compounds and subsequently reacting the diazonium salts thus obtained with sulfur dioxide in the presence of acetic acid and copper chloride according to a process described by H. Meerwein (B. 90, 841, 1957).

The isocyanate compounds of the general Formula 3 can be prepared by reacting in known manner the aniline derivatives of the general Formula 4 with phosgene, whereby an isocyanate group is formed from the amino group.

As examples of such starting compounds, which are prepared in the manner described above and may be used in accordance with the process of the present invention, there may be mentioned the following compounds: 2-(N-methyl - β - chloroethylsulfonylamino) - benzene - 1 - carboxylic acid chloride, 2-(β-chloroethylsulfonylamino)-benzene-1-carboxylic acid chloride, 4-(N-methyl-β-chloroethylsulfonylamino)-benzene-1-carboxylic acid chloride, 3-(N - methyl-β-chloroethylsulfonylamino) - benzene-1-carboxylic acid chloride, 2-(N-ethyl-β-chloroethylsulfonylamino)-benzene-1-carboxylic acid chloride, 4-(N-butyl-β-chloroethylsulfonylamino) - benzene-1-carboxylic acid chloride, 4-(N - methylvinylsulfonylamino) - benzene-1-carboxylic acid chloride or -sulfonic acid chloride, 3-(N-methyl-vinylsulfonylamino)-benzene-1-sulfonic acid chloride, 4-(N-methyl-β-chloroethylsulfonylamino)-3-chlorobenzene-1-carboxylic acid chloride, 4-β-chloroethylsulfonylamino-benzene-1-carboxylic acid chloride, 4-(N-methyl - vinylsulfonylamino)-2,5-dimethylbenzene-1-isocyanate, 4-(N - methyl-β-chloroethylsulfonylamino)-benzene - 1 - isocyanate, 3-(N-methylvinyl-sulfonylamino)-benzene-1-isocyanate, 4 - (N-methyl-β-chloroethylsulfonylamino)-3-methoxybenzene-1-isocyanate, 4 - (N-methyl-β-chloroethylsulfonylamino)-3-methoxy - 2 - methylbenzene-1-isocyanate, 3-(N-methyl - β - chloroethyl-sulfonylamino)-4-chlorobenzene-1-isocyanate and 4-(N-methyl-β-bromoethylsulfonylamino) - benzene-1-carboxylic acid bromide.

The dyestuffs used in and obtainable by the process of the present invention may contain in addition to sulfonic acid groups and sulfonic acid amide groups further substituents in the dyestuff molecule, for example, halogen atoms.

Depending on the nature and number of the substituents present, the dyestuffs obtained are, sparingly soluble or easily soluble in water.

The dyestuffs obtained by the process of the present invention are suitable for the dyeing or printing of various natural, regenerated or synthetic fibrous materials such as cotton, viscose, regenerated cellulose, wool, silk, leather, polyamides, polyacrylonitrile, cellulose acetate or aromatic polyester fibers, depending on the nature of the dyestuffs. For these purposes, the dyestuffs of the invention may be used according to the dyeing and printing methods conventionally used in the industry, as illustrated hereinafter.

The use of the dyestuffs obtained by the process of the present invention depends in the first instance on the fibrous material to be dyed and on the constitution of the dyestuff to be employed, in particular on the number and nature of the groups present which impart solubility in water. For example, those of the novel dyestuffs which preferably contain more than one group imparting solubility in water, for example, two or more sulfonic acid and/or carboxylic acid groups in the molecule, are especially suitable for the dyeing of cellulose-containing materials, particularly of cotton.

The fixation of the novel dyestuffs on the cellulose-containing fibrous materials dyed according to the usual dyeing or printing methods is carried out by a treatment with an acid-binding agent, for example, sodium or potassium hydroxide, sodium or potassium carbonate, sodium or potassium bicarbonate, sodium silicate, sodium triphosphate or sodium trichloroacetate and, if desired, by the action of heat. The treatment with the acid-binding agent can be carried out prior to, during or after the application of the dyestuff.

Thus, for example, cellulose-containing textile materials can be dyed according to the so-called direct dyeing method by treating the textile materials with an aqueous solution of the dyestuff in the presence of acid-binding agents, at a temperature in the range of, for example, 40° and 100° C.

For preparing dyeings, one may also apply the dyestuff to the cellulose-containing textile material by the usual dyeing and padding methods and then introduce the goods dyed into an aqueous solution of the acid-binding agent at a temperature in the range of 20° and 100° C.

Furthermore, the novel dyestuffs may be applied, for example, by padding or from a dyebath, at a temperature ranging from 20° to 100° C., to the textile material impregnated with an aqueous solution of the acid-binding agent, and heating, if desired, after intermediate drying.

Furthermore, the textile material may be treated with an aqueous solution of the dyestuff in the presence of the acid-binding agent, squeezed and then allowed to remain at room temperature or heated for a short period, for example, by steaming, if desired, after an intermediate drying.

The aqueous dyestuff solutions used for preparing the dyeings may be combined with other substances; thus, there may be added especially electrolytes such as sodium chloride or sodium sulfate, urea, dispersing agents, surfactants and thickeners, for example, sodium alginate.

The novel dyestuffs are also suitable for the preparation of prints on cellulose materials. For this purpose, the fabric is printed with a printing paste containing the acid-binding agent and subjected to a short heat treatment, if desired, after intermediate drying. It is also possible to apply a printing paste containing one or several of the dyestuffs obtained by the process of the invention to the cellulose fabric impregnated with an acid-binding agent and to subsequently heat the printed fabric, for example, by steaming. Furthermore, the cellulose material may first be printed with a printing paste containing one or several dyestuffs, and then treated with the aqueous solution of an acid-binding agent, preferably in the presence of electrolytes such as sodium chloride or sodium sulfate, at a temperature in the range from about 60° to 100° C. The printing pastes used for preparing the prints may also contain further substances, for example, urea, thickeners, water-in-oil emulsions, surfactants and m-nitro-benzenesulfonic acid sodium. Generally, the dyeings and prints on cellulose prepared with the novel dyestuffs are rinsed with water after the dyeing or printing process, soaped and rinsed again with water before drying.

For the dyeing of textile materials the dyestuffs of the invention, which contain no groups imparting solubility in water such as, for example, as sulfonic acid, carboxylic acid or sulfonic acid amide groups, are expediently used in the form of aqueous dispersions. Such dispersions can be obtained in the usual manner, for example, by grinding the dyestuffs of the invention with a dispersing agent in water.

Finally, the novel dyestuffs may also be used for the dyeing of nitrogen-containing textile materials, for example, wool and polyamide fibers. The dyeing is carried out from weakly alkaline, neutral or acid dyebaths in the presence of compounds conventionally used in the dyeing of nitrogen-containing textile materials, for example, sodium sulfate, ammonium acetate, surfactants such as quaternary ammonium salts, and non-ionic dispersing agents. If desired, the pH-value of the dyebath may be varied during the dyeing process by adding alkalies or alkaline salts or by adding acids or acid salts, for example, in such a manner as to start the dyeing at a pH-value of 4 and to increase the pH-value during the dyeing to 7.5.

The novel dyestuffs give in general full and clear shades which are distinguished by good properties of fastness, especially by good to very good fastness to light and to wet processing.

The following examples illustrate the invention, but they are not intended to limit it thereto:

Example 1

A mixture of 60 parts by weight of copper phthalocyanine and 250 parts by weight of chlorosulfonic acid is heated with stirring to 130–135° C. and kept for 11 hours at this temperature. The mixture is then cooled to 50° to 60° C.; 110 parts by weight of thionyl chloride are allowed to run-in the course of 1 hour. The mixture is then stirred for 4 hours at 85° to 90° C., cooled and introduced, with stirring, into a mixture of ice and water. The precipitated copper phthalocyanine-tetrasulfochloride is filtered off and washed with ice-cold water.

The wet filter residue is introduced into a mixture of 250 parts by weight of ice and 200 parts by weight of water and neutralized at 0° C. with a dilute sodium hydroxide solution. To the suspension thus obtained, there are added a neutralized solution of 38.0 parts by weight of 1,3-diaminobenzene-4-sulfonic acid in 480 parts by volume of water and, subsequently, 37 parts by weight of sodium carbonate and the whole is stirred for 24 hours at 30° to 35° C. and for 2 hours at 60° to 65° C. The reaction product is salted out with sodium chloride, filtered off and washed with a solution of sodium chloride.

The wet filter residue is dissolved in 1500 parts by volume of water and then combined, in the course of one hour, at 0° to 5° C., with a solution of 45 parts by weight of 4-(N-methyl-β-chlorethylsulfonylamino)-benzene-1-carboxylic acid chloride in 100 parts by volume of acetone and, simultaneously, with a dilute aqueous sodium carbonate solution in a manner such that the pH-value is kept at 6.2 to 6.6. When the reaction is complete, the product is salted out with potassium chloride, filtered off and washed with a dilute aqueous potassium chloride solution. After drying, there is obtained a blue dyestuff which has the formula

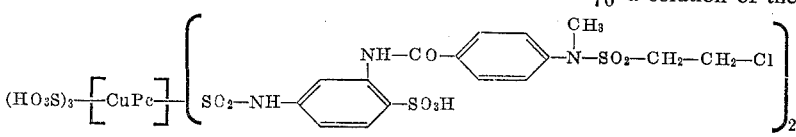

which dyes cotton or regenerated cellulose turquoise blue, light- and wash-fast shades.

Example 2

60 parts by weight of copper phthalocyanine are converted into the copper phthalocyanine-tetrasulfonic acid chloride according to the method described in Example 1. After having washed the product with ice-cold water, the wet filter residue is introduced into a mixture of 200 parts by weight of ice and 200 parts by weight of water and neutralized with a dilute sodium hydroxide solution at 0° C. to this suspension, there are added a neutralized solution of 38.0 parts by weight of 1,4-diamino-benzene-4-sulfonic acid in 510 parts by volume of water and, subsequently, 37 parts by weight of sodium carbonate and the whole is stirred for 24 hours at 30° to 35° C. and then for 2 hours at 60° to 65° C. The reaction product is salted out with sodium chloride, filtered off and washed with a sodium chloride solution.

The wet filter residue is dissolved in 1780 parts by volume of water and to this solution, there are added, in the course of one half hour, at 0° to 5° C., a solution of 50 parts by weight of 3-(N-methyl-β-chlorethylsulfonylamino)-benzene-1-carboxylic acid chloride in 110 parts by volume of dioxane and, simultaneously, a dilute aqueous sodium carbonate solution in such a manner that the pH-value is maintained at 6.5 to 7.0. When the reaction is complete, the product is salted out with potassium chloride, filtered off, washed with a potassium chloride solution and dried at 50° to 60° C. under reduced pressure. The new dyestuff which has the formula

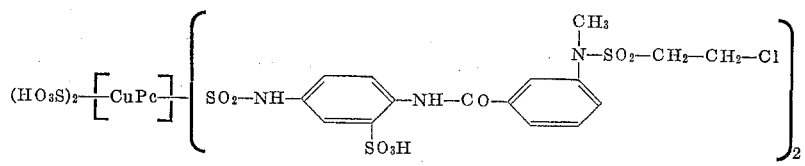

constitutes a blue powder which gives light- and wash-fast greenish blue prints on cotton, when applied in the presence of sodium carbonate.

Example 3

60 parts by weight of copper phthalocyanine are converted into the copper phthalocyanine-tetrasulfonic acid chloride according to the method described in Example 1. The sulfonic acid chloride obtained is then reacted as indicated with 1,3-diamino-benzene-4-sulfonic acid.

The wet filter residue of the condensation product is dissolved in 1600 parts by volume of water. Into the solution, which, if required, has been adjusted to a pH-value of 7 by means of sodium carbonate there are introduced dropwise, in the course of 30 minutes, while stirring vigorously, at 0° to 5° C., 50 parts by weight of 3 - (N-methyl-vinyl-sulfonyl-amino)-benzene-1-isocyanate, dissolved in 150 parts by volume of acetone. The mixture is stirred for 6 hours and then potassium chloride is added. The precipitated dyestuff is filtered off, washed with an aqueous potassium chloride solution and dried.

When this product which has the formula

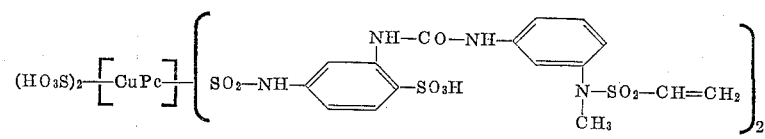

is applied to cotton by first impregnating the cotton with a solution of the dyestuff and then after-treating it with aqueous sodium hydroxide, greenish-blue dyeings are obtained which are fast to washing.

*Example 4*

The process is carried out as described in Example 1, but using 59.0 parts by weight of nickel phthalocyanine instead of copper phthalocyanine.

When the dyestuff thus obtained which has the formula

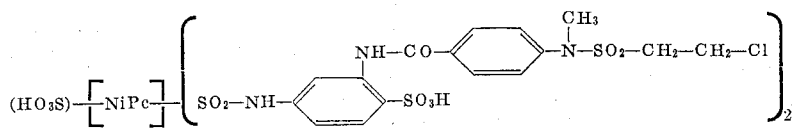

is applied to cotton in the presence of sodium bicarbonate, greenish-blue dyeings that have good fastness to washing, are obtained.

*Example 5*

57.7 parts by weight of copper phthalocyanine are converted into the copper phthalocyanine-tetrasulfonic acid chloride in the usual manner and condensed in an aqueous medium with 15 parts by weight of 1-amino-4-acetyl-aminobenzene or 14 parts by weight of 4-amino-formyl-anilide. In order to saponify the acylamino group, the whole is boiled with dilute sulfuric acid. The compound obtained which has the formula

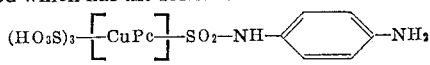

is stirred into 1920 parts by volume of water and neutralized with a dilute sodium hydroxide solution. A solution of 32.6 parts by weight of 3-(N-methyl-β-chloro-ethylsulfonylamino)-benzene-1-carboxylic acid chloride in 50 parts by volume of acetone is allowed to run into the solution, while stirring vigorously, at 0° to 5° C., in the course of 1½ hours. By simultaneously adding solid potassium carbonate, the pH-value is kept at 7.0 to 7.2. When the condensation is complete, the dyestuff formed having the formula

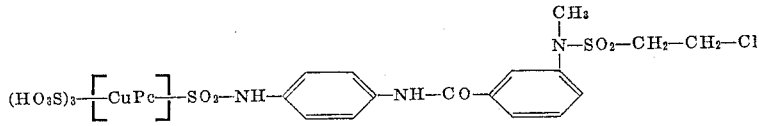

is separated by means of sodium chloride, filtered off and dried at 60° C. In the presence of acid-binding agents, the new dyestuff dyes cotton greenish blue shades which are fast to light and to washing.

*Example 6*

60 parts by weight of copper phthalocyanine are converted as described in Example 1 into the copper phthalocyanine-tetrasulfonic acid chloride and then condensed at 20° C. with 27.6 parts by weight of 4,4'-diamino-diphenyl-3-sulfonic acid, in water and in the presence of sodium carbonate. The unreacted sulfonic acid chloride groups are subsequently saponified in a sodium alkaline medium at 60° C. The dyestuff that has formed is separated by means of sodium chloride and isolated. The compound obtained is dissolved in 2800 parts by volume of water and combined in the course of 3 hours, while stirring vigorously, at 0° to 5° C., with a solution of 38 parts by weight of 4-(N-methyl-β-chloroethylsulfonylamino)-benzene-1-carboxylic acid chloride in 60 parts by volume of acetone. By the simultaneous addition of an aqueous sodium carbonate solution having a strength of 10% by weight, the pH-value is kept at 6 to 7.2. When the mentioned acid chloride is consumed, the new dyestuff of the formula.

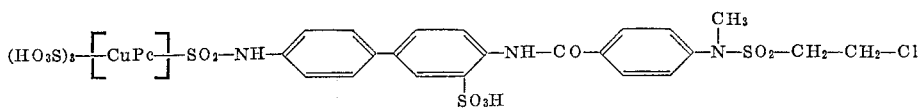

is salted out with sodium chloride, filtered off and dried at 50° C. under reduced pressure. A dark powder is obtained which dyes cellulose fibers in the presence of acid-binding agents intensely bluish green shades that have good fastness to washing. Dyestuffs that have similar properties can be prepared by reacting under corresponding reaction conditions the phthalocyanine dyestuffs (I) listed in the following table with the respective acid chlorides or isocyanates (II).

| | I<br>Phthalocyanine dyestuff | II<br>Acylating agent | Tint on cotton |
|---|---|---|---|
| 1 | [CuPc](SO₃H)₃ / SO₂—NH—⟨ ⟩—NH₂ | 4-(N-methylvinyl-sulfonylamino)-benzene-1-sulfonic acid chloride. | Greenish blue. |
| 2 | [CuPc](SO₃H)₃ / SO₂—NH—⟨ ⟩—NH₂ | 4-(N-ethyl-β-chloroethylsulfonylamino)-benzene-1-carboxylic acid chloride. | Do. |

| | I<br>Phthalocyanine dyestuff | II<br>Acylating agent | Tint on cotton |
|---|---|---|---|
| 3 | [CuPc(SO₃H)₃ / SO₂—NH—C₆H₄—NH₂] | 4-(N-butyl-β-chloroethylsulfonylamino)-benzene-1-carboxylic acid chloride. | Do. |
| 4 | [CuPc(SO₃H)₂ / SO₂—NH—C₆H₃(SO₃H)—NH₂] | 3-(N-methyl-β-chloroethylsulfonylamino)-benzene-1-carboxylic acid chloride. | Do. |
| 5 | [CuPc(Cl)(SO₃H)₂ / SO₂—NH—C₆H₄—NH₂] | 4-(N-methyl-vinyl-sulfonylamino)-benzene-1-carboxylic acid chloride. | Do. |
| 6 | [CuPc(SO₃H)₃ / SO₂—NH—C₆H₃(SO₃H)—S—C₆H₃(SO₃H)—NH₂] | ----do---- | Do. |
| 7 | [CuPc(SO₃H)₂ / (SO₂—NH—C₆H₃(SO₃H)₂—NH—NH₂)] | 4-(N-methyl-β-chloroethylsulfonylamino)-benzene-1-carboxylic acid chloride. | Do. |
| 8 | [CuPc(SO₃H)₂ / SO₂—N(piperazine)NH] | 4-(N-methyl-vinyl-sulfonylamino)-benzene-1-isocyanate. | Do. |
| 9 | [CuPc(SO₃H)₂ / (CH₂NH—C₆H₃(SO₃H)₂—NH₂)] | 4-(β-chloroethyl-sulfonylamino)-benzene-1-carboxylic acid chloride. | Do. |
| 10 | [CuPc(SO₃H)₂₋₃ / NH₂] | 4-(N-ethyl-β-chloroethylsulfonylamino)-benzene-1-carboxylic acid chloride. | Do. |
| 11 | [CuPc(SO₃H)₂ / (SO₂—NH—CH₂—CH₂—NH₂)₂] | ----do---- | Do. |

Example 7

98.5 parts by weight of the phthalocyanine dyestuff of the formula

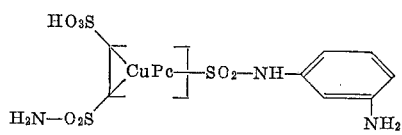

obtained by the condensation of 1 mol of copper phthalocyanine disulfochloride with 1 mol of 3-amino-acetanilide in the presence of an aqueous ammonia solution and subsequent saponification of the acetylamino group, are suspended in 2500 parts by volume of water and dissolved by neutralization with a binormal sodium hydroxide solution. The solution thus obtained is cooled to 0° to 5° C. and combined in the course of 2 hours, while stirring vigorously, with a solution of 35 parts by weight of 4-(N-methyl - β - chloroethyl - sulfonylamino) - benzene-1-carboxylic acid chloride in 90 parts by volume of acetone. By simultaneously dropwise adding a binormal sodium carbonate solution, the mixture is kept at a pH-value of 6.5 to 7.0. The mixture is then stirred for 12 hours at 0° to 5° C. and then for 3 hours at 30° to 35° C., while continuously controlling the pH-value. The precipitation of the dyestuff formed is completed by strewing in sodium chloride, the dyestuff is filtered off and dried.

The dyestuff thus obtained constitutes a blue powder which dissolves in a dilute sodium hydroxide solution to give a greenish blue solution. From this solution, cotton is dyed greenish blue shades which are fast to washing. The following table lists further dyestuffs which can be obtained according to the method described in Example 8 by condensing the phthalocyanine dyestuffs listed in column I with the respective acylating agents listed in column II.

mediately suspended in 1500 parts by volume of ice-water and neutralized with a dilute sodium hydroxide solution. Sodium carbonate is then introduced portionwise, while stirring vigorously, in such a manner that the pH-value is kept at 6.7 to 7.7. Instead of sodium carbonate, there may also be used other acid-binding agents such as potassium hydroxide, ammonium carbonate or ammonia. When using ammonium a part of the sulfochloride groups is converted into sulfonic acid amide groups. In this case, there is formed a condensation product which contains sulfonic acid and sulfonic acid amide groups. After 18 hours, the mixture is heated to 35° to 40° C., while

| | I<br>Phthalocyanine dyestuff | II<br>Acylating agent | Tint on cotton |
|---|---|---|---|
| 1 | $HO_3S$<br>$H_2N-O_2S$<br>$CuPc-(SO_2-NH-\langle\rangle-NH_2)_2$ with $SO_3H$ | 4-(N-methyl-β-chloroethylsulfonylamino)-benzene-1-carboxylic acid chloride. | Greenish blue. |
| 2 | $HO_3S$<br>$H_2N-O_2S$<br>$CuPc-(SO_2-NH-\langle\rangle-SO_3H)_2$ with $NH_2$ | do | Do. |
| 3 | $HO_3S$<br>$H_2N-O_2S$<br>$NiPc-(SO_2-NH-\langle\rangle-SO_3H)_2$ with $NH_2$ | do | Do. |
| 4 | $(HO_3S)_2$<br>$H_2N-O_2S$<br>$CuPc-SO_2-NH-CH_2-CH_2-NH_2$ | do | Do. |

*Example 8*

60 parts by weight of copper phthalocyanine are converted into the copper phthalocyanine-tetrasulfonic acid chloride according to the method described in Example 1. The sulfochloride obtained is further condensed as a wet paste with the intermediate product described below.

27.6 parts by weight of 1,3-diaminobenzene-4-sulfonic acid are dissolved in 392 parts by volume of water with the addition of dilute sodium hydroxide solution so that a neutral solution is obtained. To this solution, there is added at 0° to 5° C., in the course of 3 hours, while stirring vigorously, a solution of 64.8 parts by weight of 4 - (N - methyl - β - chloroethylsulfonylamino) - benzene-1-carboxylic acid chloride in 100 parts by volume of acetone. The hydrochloric acid formed during the condensation is neutralized by adding a dilute sodium carbonate solution in such a manner that the pH-value is maintained at 6.0 to 6.5. As soon as the condensation is complete, the condensation product, which has partly precipitated, is completely salted out by the addition of sodium chloride, filtered off and washed with a 20% sodium chloride solution.

The washed paste and the copper phthalocyanine sulfochloride paste obtained according to paragraph 1 are immediately suspended in 1500 parts by volume of ice-water and neutralized with a dilute sodium hydroxide solution.

maintaining the indicated pH-value by adding sodium carbonate. When the condensation is complete, the pH-value is adjusted to 6, if required, and the dyestuff is salted out by adding sodium chloride and filtered. The product is washed with a 15% sodium chloride solution and dried at 50° to 60° C. under reduced pressure. In the presence of sodium hydroxide and sodium triphosphate, the dyestuff which has the formula

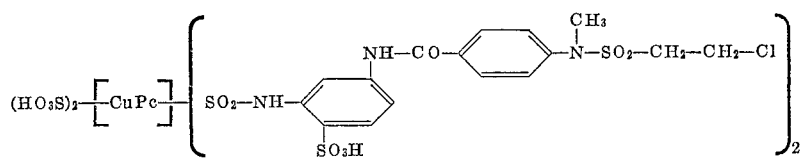

gives greenish blue dyeings on cotton which are very fast to light and to washing.

When using the same quantity by weight of 1,4-diaminobenzene-2-sulfonic acid instead of 1,3-diaminobenzene-4-sulfonic acid, a dyestuff having similar properties is obtained.

We claim:
1. The phthalocyanine dyestuff of the formula

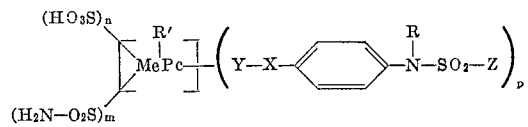

wherein Pc represents phthalocyanine, Me represents a member selected from the group consisting of copper and nickel, Y represents a member selected from the group consisting of —NH—, —SO₂—NH-lower alkylene-NH—,

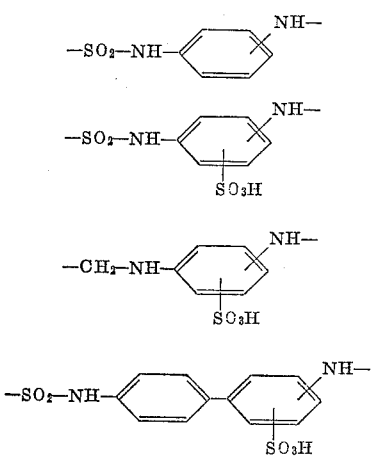

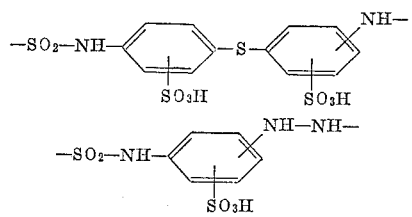

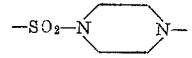

and

X represents a member selected from the group consisting of —CO—, —SO₂— and —CO—NH—, R represents a member selected from the group consisting of hydrogen and lower alkyl, R' represents hydrogen or chlorine, Z represents a member selected from the group consisting of —CH=CH₂ and —CH₂—CH₂—Cl, n represents an integer from 1 to 3, m represents a number from 0 to 2, and p represents an integer from 1 to 2.

2. The dyestuff of the formula

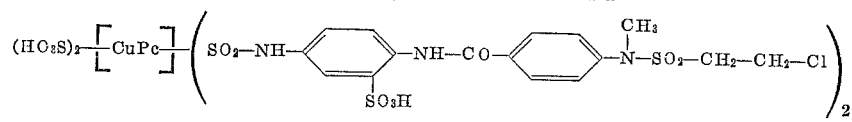

3. The dyestuff of the formula

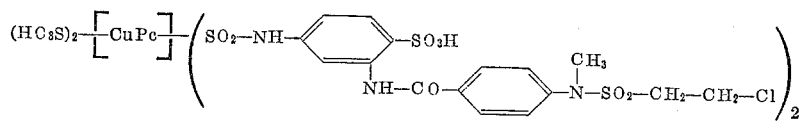

4. The dyestuff of the formula

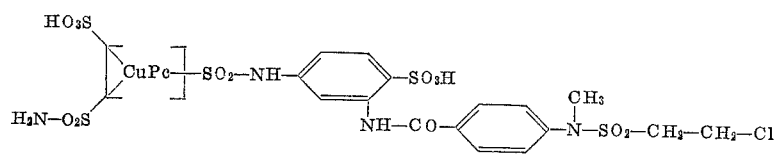

5. The dyestuff of the formula

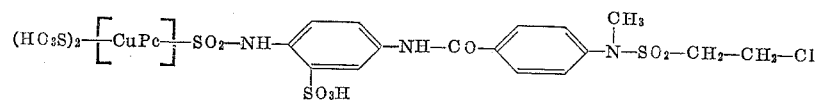

6. The dyestuff of the formula

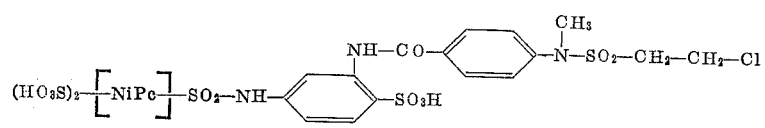

References Cited by the Examiner
UNITED STATES PATENTS
3,114,746  12/1963  Benz et al. _____ 260—163
3,232,931   2/1966  Rothman _____ 260—242

WALTER A. MODANCE, *Primary Examiner.*
JAMES A. PATTEN, *Assistant Examiner.*